(12) United States Patent
Kim et al.

(10) Patent No.: US 10,770,749 B2
(45) Date of Patent: Sep. 8, 2020

(54) ELECTROLYTE ADDITIVE AND LITHIUM SECONDARY BATTERY COMPRISING THE SAME

(71) Applicant: SOULBRAIN CO., LTD., Seongnam-si, Gyeonggi-do (KR)

(72) Inventors: Jae Yoon Kim, Seongnam-si (KR); Min Goo Kim, Seongnam-si (KR); Jong Hyun Lee, Seongnam-si (KR); Ji Seong Han, Seongnam-si (KR)

(*) Notice: Subject to any disclaimer, the term of this patent is extended or adjusted under 35 U.S.C. 154(b) by 146 days.

(21) Appl. No.: 16/170,048

(22) Filed: Oct. 25, 2018

(65) Prior Publication Data
US 2019/0131652 A1 May 2, 2019

(30) Foreign Application Priority Data

Nov. 2, 2017 (KR) .................. 10-2017-0145224
Dec. 1, 2017 (KR) .................. 10-2017-0164244

(51) Int. Cl.
| | | |
|---|---|---|
| H01M 10/056 | (2010.01) | |
| H01M 10/0525 | (2010.01) | |
| H01M 4/38 | (2006.01) | |
| H01M 10/0567 | (2010.01) | |
| H01M 4/525 | (2010.01) | |
| H01M 4/505 | (2010.01) | |

(52) U.S. Cl.
CPC .......... *H01M 10/056* (2013.01); *H01M 4/382* (2013.01); *H01M 10/0525* (2013.01); *H01M 10/0567* (2013.01); *H01M 4/505* (2013.01); *H01M 4/525* (2013.01); *H01M 2300/0025* (2013.01); *H01M 2300/0028* (2013.01)

(58) Field of Classification Search
CPC .......... H01M 10/056; H01M 10/0525; H01M 10/0567; H01M 4/382; H01M 4/505; H01M 4/525; H01M 2300/0028; H01M 2300/0025; H01B 1/12
See application file for complete search history.

(56) References Cited

U.S. PATENT DOCUMENTS

| | | | |
|---|---|---|---|
| 6,221,941 B1 * | 4/2001 | Strauss | C07F 5/003 524/176 |
| 2018/0076484 A1 * | 3/2018 | Nakatsutsumi | H01M 10/0568 |

FOREIGN PATENT DOCUMENTS

WO  WO-2017047019 A1 *  3/2017  ........ H01M 10/0525

\* cited by examiner

*Primary Examiner* — Gregg Cantelmo
(74) *Attorney, Agent, or Firm* — Jongkook Park

(57) ABSTRACT

Provided is an electrolyte additive including a salt of an anion represented by Chemical Formula 1 below, with $Cs^+$ or $Rb^+$:

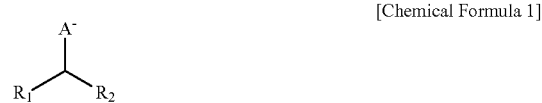

[Chemical Formula 1]

wherein A is O or S, and $R_1$ and $R_2$ are each independently a $C_1$-$C_{10}$ alkyl group in which all or some of the hydrogen atoms are substituted with halogen atoms.

11 Claims, No Drawings

ELECTROLYTE ADDITIVE AND LITHIUM SECONDARY BATTERY COMPRISING THE SAME

CROSS-REFERENCE TO RELATED APPLICATIONS

This application claims priority under 35 U.S.C. § 119 to Korean Patent Application No. 10-2017-0145224 filed on Nov. 2, 2017, and Korean Patent Application No. 10-2017-0164244 filed on Dec. 1, 2017, in the Korean Intellectual Property Office, the disclosure of which is incorporated herein by reference in its entirety.

TECHNICAL FIELD

The following disclosure relates to an electrolyte additive and a lithium secondary battery including the same in a non-aqueous electrolyte.

BACKGROUND

In accordance with the recent development of the information and communication industry, electronic devices are becoming smaller, lighter, thinner, and more portable. As a result, there is a growing demand for high energy densification of batteries used as power sources for these electronic devices. As lithium secondary batteries are best able to meet these demands, research thereon is being actively conducted.

Lithium secondary batteries include a cathode, an anode, an electrolyte providing a pathway for the movement of lithium ions between the cathode and the anode, and a separator. Electrical energy is generated by oxidation and reduction reactions when lithium ions are intercalated and de-intercalated in the cathode and anode.

Lithium secondary batteries have an average discharge voltage of about 3.6 to 3.7 V, presenting an advantage in that the discharge voltage thereof is higher than other alkaline batteries and nickel-cadmium batteries. In order to achieve such a high driving voltage, an electrolyte composition which is electrochemically stable at a charge-discharge voltage range of 0 to 4.2V is required.

At the time of initial charging of a lithium secondary battery, lithium ions generated from a cathode active material such as a lithium metal oxide, or the like, migrate to an anode active material such as a graphite-based material, or the like, and are intercalated between layers of the anode active material. Herein, since lithium is highly reactive, it reacts with an electrolyte and carbon the composing the anode active material on the surface of the anode active material (such as a graphite-based material), thereby resulting in the production of a compound such as $Li_2CO_3$, $Li_2O$, or $LiOH$. These compounds form a solid electrolyte interface (SEI) film on the surface of the anode active material.

The SEI film acts as an ion tunnel and allows only lithium ions to pass through. Since the SEI film has the effect of an ion tunnel, an organic solvent molecule with a high molecular weight moving together with the lithium ions in the electrolyte is inserted between the layers of the anode active material to prevent the anode structure from being destroyed. Therefore, it is possible to prevent contact between the electrolyte and the anode active material, and thus degradation of the electrolyte does not occur and the amount of lithium ions in the electrolyte is reversibly maintained, thereby enabling the charge/discharge to be maintained stably.

In the related art, it is difficult to expect to achieve an improvement in the lifetime characteristics if lithium ion secondary batteries since an uneven SEI film is formed in the case of employing an electrolyte that does not contain an electrolyte additive or an electrolyte that contains an electrolyte additive with poor characteristics. Further, even when the electrolyte includes an electrolyte additive, if the amount of the electrolyte additive is not able to be adjusted to a required amount, problems have been encountered in which the electrolyte additive causes degradation of a cathode surface or an oxidation reaction of the electrolyte during high temperature or high voltage reactions, ultimately resulting in an increase of the irreversible capacity loss of the secondary battery, with deterioration of the lifetime characteristics.

SUMMARY

In order to solve the problems described above, in one general aspect, an electrolyte additive of the present invention includes a salt of an anion represented by Chemical Formula 1 below, with $Cs^+$ or $Rb^+$.

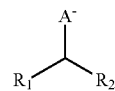

[Chemical Formula 1]

Here, A is O or S, and $R_1$ and $R_2$ are each independently $C_1$-$C_{10}$ alkyl groups in which all or some of the hydrogen atoms are substituted with halogen atoms.

In another general aspect, a non-aqueous electrolyte of the present invention includes: a lithium salt, a non-aqueous organic solvent, and the electrolyte additive as described above.

In still another general aspect, a lithium secondary battery of the present invention includes: a cathode employing a cathode active material; an anode employing an anode active material; a separator interposed between the cathode and the anode; and the non-aqueous electrolyte as described above.

DETAILED DESCRIPTION OF EMBODIMENTS

Hereinafter, the present disclosure will be described in more detail to assist in understanding the technical ideas of the present disclosure.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the terms in order to describe their own disclosures in best mode.

An electrolyte additive according to an embodiment of the present disclosure comprises an electrolyte additive including a salt of an anion represented by Chemical Formula 1 below, with $Cs^+$ or $Rb^+$.

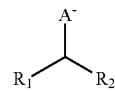

[Chemical Formula 1]

Here, A is O or S, and $R_1$ and $R_2$ are each independently $C_1$-$C_{10}$ alkyl groups in which all or some of the hydrogen atoms may be substituted with halogen atoms.

Specifically, the anion represented by Chemical Formula 1 may be one or more selected from a group consisting of the anions represented by Chemical Formulas 2 to 5 below:

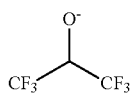

[Chemical Formula 2]

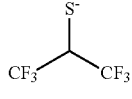

[Chemical Formula 3]

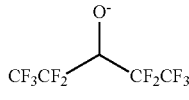

[Chemical Formula 4]

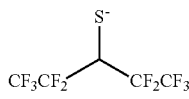

[Chemical Formula 5]

In addition, the present disclosure may provide a non-aqueous electrolyte including: a lithium salt, a non-aqueous organic solvent, and the electrolyte additive as described above.

The salt of the anion represented by Chemical Formula 1 with $Cs^+$ or $Rb^+$ can easily induce the formation of a coating film on the surface of a cathode and an anode in an electrolyte. In general, in an environment in which a secondary battery is repeatedly charged and discharged, an oxidation reaction proceeds on a surface of the cathode, and a reduction reaction proceeds on a surface of the anode. The additive according to an embodiment of the present disclosure may form coating films on the surfaces of the cathode and the anode to effectively control the elution of lithium ions generated from the cathode and to prevent degradation of the cathode. More specifically, the coating film formed by the additive on the surface of the anode is partially degraded through a reduction reaction at the time of the charging and discharging of the battery, but the degraded additive moves to the surface of the cathode again to is able to again form a film on the surface of the cathode through an oxidation reaction. Therefore, even when charging and discharging processes are repeated several times, the additive may maintain the film coating on the surface of the cathode, thereby effectively preventing excessive elution of lithium ions from the cathode. The reason for this is not clear, but is presumably resulted from the chemical properties of the $Cs^+$ or $Rb^+$ possessed by the additive according to an embodiment of the present disclosure, as ions of an alkaline group element, which are close to the $Li^+$ present in the cathode and the anode. Therefore, the secondary battery according to an embodiment of the present disclosure may effectively achieve improvement of the high temperature and low temperature lifetime characteristics through maintenance of and preventing the degradation of the structure of the cathode, even when the cathode is repeatedly charged and discharged.

In the related art, when a conventional electrolyte or additive is used in a lithium secondary battery, the additive causes degradation of the surface of the cathode and oxidation of the electrolyte due to an increase in reactivity between the cathode and the electrolyte, thus resulting in deterioration in the safety and performance of the battery. When stored at low or high temperatures, conventionally employed additives undergo excessive degradation and a very thick insulator is formed on the cathode, thereby preventing lithium ions from migrating, and thus the recovery capacity is not generated at all.

According to another embodiment of the present disclosure, the electrolyte additive may further include one or more salts selected from a group consisting of $CsCF_3SO_3$, $CsPO_2F_2$, $CsPF_2(C_2O_4)_2$ and $CsB(C_2O_4)_2$.

Employing a combination of additives may reduce the side-reactivity between the cathode and the electrolyte and the generated contact surface thereof to improve the safety of the battery. Due to characteristics of having a high reaction potential and achieving hardly any change in the reaction potential following cycle progression, it is possible to prevent the deterioration of battery performance due to degradation of additives and the rapid change of reaction potential observed in the related art. Further, the additive forms a stable coating film through the oxidation reaction in the cathode to prevent the degradation of the cathode and suppress elution, and thus it is possible to provide more stable protection of the cathode under a high voltage environment.

According to an embodiment of the present disclosure, the total content of the additive may be 0.05 to 10 wt % based on a total amount of the non-aqueous electrolyte. Preferably, the content of the additive may be 0.1 to 3 wt % based on the total amount of the non-aqueous electrolyte.

If the content of the additive is less than 0.05 wt %, the effect of improving the low and high temperature storage characteristics and the high temperature lifetime characteristics of the lithium secondary battery may be insignificant. Alternatively, if the content of the additive exceeds 10 wt %, the resistance may increase due to excessive formation of the coating film.

In particular, when the additive combination is applied to a lithium secondary battery, it is possible to improve the low and high temperature storage characteristics as well as the high temperature lifetime characteristics of the additive containing the salt with $Cs^+$ or $Rb^+$, thereby securing the stability of the constructed secondary battery through minimization of the thickness change rate. Particularly, the high temperature output characteristics of the constructed secondary battery are also secured by achieving uniform formation of the coating film, in addition to the effect of improving the lifetime and resistance characteristics of the secondary battery at high temperatures.

The lithium salt may include a lithium salt commonly used in the art, and may include, for example, one or more selected from a group consisting of $LiPF_6$, $LiAsF_6$, $LiBF_6$, $LiSbF_6$, $LiAlO_4$, $LiAlCl_4$, and $LiClO_4$.

The concentration of the lithium salt in the non-aqueous electrolyte is preferably 0.01 mol/L to 2 mol/L, and more preferably 0.01 mol/L to 1 mol/L.

Further, as the non-aqueous organic solvent employed in the present disclosure, organic solvents commonly used in electrolytes for lithium secondary batteries may be used without limitation, and for example, may include ether, ester, amide, linear carbonate, cyclic carbonate, phosphate-based compounds, nitrile-based compounds, fluorinated ether-based compounds, fluorinated aromatic-based compounds, and the like, which may be used alone or in combination of two or more.

Among these non-aqueous organic solvents, representatively, a carbonate compound which is a cyclic carbonate, a linear carbonate or a mixture thereof may be included. Specific examples of the cyclic carbonate compound may include one or more selected from a group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and a halide thereof.

Further, specific examples of the linear carbonate compound may include one or more selected from a group consisting of dimethyl carbonate (DMC), diethyl carbonate (DEC), dipropyl carbonate (DPC), ethyl methyl carbonate (EMC), methyl propyl carbonate (MPC), and ethyl propyl carbonate, but the linear carbonate compound is not limited thereto.

More specifically, the cyclic carbonate in a carbonate-based electrolyte solvent preferably contains propylene carbonate, ethylene carbonate, or a mixture thereof, which is preferable since these are high-viscosity organic solvents and have a high permittivity to dissociate the lithium salt well in the electrolyte.

Further, it is preferable to use a mixture of the cyclic carbonate with a linear carbonate such as diethyl carbonate, dimethyl carbonate, ethyl methyl carbonate or a mixture thereof. Employing a mixture of the cyclic carbonate with the linear carbonate having low viscosity and low permittivity at an appropriate ratio thereby enables preparation of an electrolyte having a high electric conductivity.

In addition, examples of the ester for the electrolyte solvent may include one or more selected from a group consisting of methyl acetate, ethyl acetate, propyl acetate, ethyl propionate (EP), propyl propionate, methyl propionate (MP), γ-butyrolactone, γ-valerolactone, γ-caprolactone, δ-valerolactone, and ε-caprolactone. However, among these examples, it is particularly preferable to include ethyl propionate (EP), propyl propionate, methyl propionate (MP), or a mixture thereof, as they have low viscosity.

The phosphoric acid-based solvent and mononitrile-based solvent may be substituted with a fluorine atom (F). When the solvent is substituted with a halogen element, a great increase in the flame retardancy is observed. However, when the solvent is substituted with Cl, Br, I, or the like, the reactivity of the solvent increases together, which is not preferable as an electrolyte.

In the non-aqueous electrolyte of the present disclosure, non-limiting examples of the phosphate-based compound may include trimethylphosphine oxide, triethylphosphine oxide, tripropylphosphine oxide, triphenylphosphine oxide, diethyl methylphosphonate, dimethyl methylphosphonate, diphenyl methylphosphonate, bis(2,2,2-trifluoroethyl) methylphosphonate, trimethyl phosphate, triethyl phosphate, tripropyl phosphate, ethyl methyl phenyl phosphate, and the like. These phosphate-based solvents may be used alone or in a combination of two or more.

Further, non-limiting examples of the nitrile-based compound may include acetonitrile, propionitrile, butyronitrile, valeronitrile, caprilonitrile, heptanenitrile, cyclopentanecarbonitrile, cyclohexanecarbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, and the like. These nitrile-based solvents may be used alone or in a combination of two or more.

Further, examples of the fluorinated ether-based compound may include bis-2,2,2-trifluoroethyl ether, n-butyl-1,1,2,2-tetrafluoroethyl ether, 2,2,3,3,3-pentafluoropropyl methyl ether, 2,2,3,3,3-pentafluoropropyl, 1,1,2,2-tetrafluoro ethyl ether, 1,1,2,2-tetrafluoroethyl methyl ether, 1,1,2,2-tetrafluoroethyl ethyl ether, trifluoroethyl dodecafluorohexyl ether, and the like, but are not limited thereto. These fluorinated ether-based solvents may be used alone or in combinations of two or more thereof.

Non-limiting examples of the aromatic compound-based solvent may include halogenated benzene compounds such as chlorobenzene, chlorotoluene, fluorobenzene, and the like, and alkylated aromatic compounds such as tert-butylbenzene, tert-pentylbenzene, cyclohexylbenzene, hydrogen biphenyl, hydrogenated terphenyl, and the like. Herein, an alkyl group of the alkylated aromatic compound may be halogenated, and as an example thereof, a fluorinated aromatic compound may be included. Examples of the fluorinated compound may include trifluoromethoxy benzene, and the like.

Meanwhile, the lithium secondary battery according to an embodiment of the present disclosure may include a cathode employing a cathode active material, an anode employing an anode active material, a separator interposed between the cathode and the anode, and the non-aqueous electrolyte.

In the cathode, any cathode active material may be used without limitation if it is a compound capable of reversibly intercalating/de-intercalating lithium.

In the lithium secondary battery according to the embodiment of the present disclosure, the cathode active material may include one or more selected from a group consisting of spinel lithium transition metal oxides with high capacity characteristics and having a hexagonal layered rock-salt structure, olivine structure or cubic structure, $V_2O_5$, TiS, and MoS. More specifically, the cathode active material may include, for example, one or more compounds selected from a group consisting of the compounds represented by Chemical Formulas 6 to 8 below:

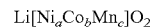   [Chemical Formula 6]

$(0.1 \le c \le 0.5,\ 0 < a+b < 0.9,\ a+b+c=1)$;

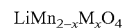   [Chemical Formula 7]

(M is one or more elements selected from the group consisting of Ni, Co, Fe, P, S, Zr, Ti and Al, $0 < x \le 2$);

   [Chemical Formula 8]

(M is one or more elements selected from the group consisting of Al, Mg, Ni, Co, Mn, Ti, Ga, Cu, V, Nb, Zr, Ce, In, Zn, and Y, X is one or more elements selected from the group consisting of O, F, and N, A is P, S or a mixed element thereof, $0 \le a \le 0.2$, and $0.5 \le x \le 1$).

The cathode active material may preferably include one or more selected from a group consisting of $Li[Ni_{0.6}Co_{0.2}Mn_{0.2}]O_2$, $Li(Ni_{0.5}Co_{0.2}Mn_{0.3})O_2$, $Li[Ni_{1/3}Co_{1/3}Mn_{1/3}]O_2$, and $LiCoO_2$.

According to a particularly preferable embodiment, $Li[Ni_aCo_bMn_c]O_2$ may be used for the cathode to thereby achieve a synergistic effect in combination with the additive of the present disclosure. When the cathode active material of lithium-nickel-manganese-cobalt-based oxide is employed, it may have an unstable structure due to cationic mixing in which Li monovalent ions ($Li^+$) and Ni divalent ions ($Ni^{+2}$) are switched in the layered structure of the cathode active material during the charge/discharge process as the content of Ni in transition metals increases, and thus the cathode active material causes a side reaction with the electrolyte, elution of the transition metal, or the like, to occur. Therefore, when the electrolyte additive according to an embodiment of the present disclosure is used, it is presumed that the cation mixing of the ions can be minimized.

Meanwhile, the anode active material includes amorphous carbon or crystalline carbon, and specific examples thereof may include carbons such as non-graphitizable carbon, graphite-based carbon, and the like; metal complex oxides such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group 1, Group 2, Group 3 elements of the periodic table, or halogen; 0<x≤1; 1≤y≤3; 1≤z≤8), and the like; lithium metal; lithium alloy; silicon-based alloy; tin-based alloy; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$, and the like; conductive polymers such as polyacetylene, and the like; Li—Co—Ni-based materials, and the like.

The separator may be produced using a porous polymer film, for example, made of a polyolefin-based polymer such as an ethylene homopolymer, a propylene homopolymer, an ethylene/butene copolymer, an ethylene/hexene copolymer, an ethylene/methacrylate copolymer, or the like, either alone or constructed by stacking two or more porous polymer films. In addition, a non-woven fabric made of a conventional porous non-woven fabric, for example, a glass fiber having a high melting point, polyethylene terephthalate fiber, or the like, may be used, but the separator is not limited thereto.

The cathode and/or the anode may be produced by mixing and stirring a binder and a solvent, and if necessary, a conventionally usable conductive agent and a dispersant to prepare a slurry, and then applying and compressing the slurry to a current collector.

Examples of the binder may include various kinds of binder polymers, such as polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, ethylene-propylene-diene monomer (EPDM), sulfonated EPDM, styrene butylene rubber (SBR), fluorine rubber, various copolymers, and the like.

According to an embodiment of the present disclosure, the lithium secondary battery including the additive may be subjected to formation and aging processes to secure the performance of the secondary battery.

The formation process activates the battery by repeating the charge and discharge process after assembly of the battery, wherein lithium ions from a lithium metal oxide used as a cathode during charging are migrated and intercalated into a carbon electrode used as an anode, and lithium has strong reactivity to react with the carbon anode to produce compounds such as $Li_2CO_3$, LiO, LiOH, and the like, which form a solid electrolyte interface (SEI) coating film on the surface of the anode. In addition, the aging process stabilizes the activated battery by allowing the battery to stand for a predetermined period of time.

The SEI film is formed on the surface of the anode through the above-described formation process. It is general that the SEI film is stabilized by a room temperature aging process, i.e., by allowing the battery to stand at room temperature for a predetermined period of time. It may be confirmed that the lithium secondary battery using the non-aqueous electrolyte including the additive according to the embodiment of the present disclosure may not experience problems such as reduction in the stability of the SEI film, degradation thereof, and the like, due to the high temperature because of the Cs and Rb, which are homologous elements to lithium, not only when a room temperature aging process is performed, but even when a high temperature aging process is undertaken.

The formation process is not particularly limited, and the battery may be half-charged at 1.0 to 3.8 V or fully charged at 3.8 to 4.3 V. Further, the battery may be charged at a current density of 0.1 C to 2 C (c-rate) for about 5 minutes to 1 hour.

The aging process may be performed at room temperature or at a temperature range of 60 to 100° C. (high temperature). If the temperature exceeds 100° C., it is possible that an exterior material may be ruptured or the battery may be ignited due to evaporation of the electrolyte. Further, the remaining capacity (state of charge: SOC) of the battery may be in any range from 100%, which is a fully charged state, to 0% due to the discharge. In addition, the storage time is not particularly limited, but it is preferable to set the time from about 1 hour to 1 week.

The external shape of the lithium secondary battery according to an embodiment of the present disclosure is not particularly limited, but it may be employed as a cylindrical shape using a can, a prismatic shape, a pouch shape, a coin shape, or the like.

Hereinafter, the present disclosure is described in detail with reference to Reference Examples, Examples and Comparative Examples. However, the following Examples according to the present disclosure may be modified into various embodiments, and should not be interpreted as limiting the scope of the present disclosure. These Examples of the present disclosure are provided so that those skilled in the art may gain a more thorough understanding of the present disclosure.

EXAMPLES AND COMPARATIVE EXAMPLES

Example 1

[Preparation of Electrolyte]

A non-aqueous electrolyte was prepared by adding a non-aqueous organic solvent having a composition of ethylene carbonate (EC):ethylmethyl carbonate (EMC):diethyl carbonate (DEC)=30:50:20 (volume ratio), $LiPF_6$ as a lithium salt in an amount of 1.15 mol/L, and 0.5 wt % of a salt of Chemical Formula 2 below as an additive, based on the total amount of the non-aqueous electrolyte.

[Chemical Formula 2]

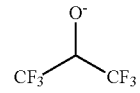

[Production of Lithium Secondary Battery]

A cathode mixture slurry was prepared by adding 92 wt % of $Li(Ni_{0.5}Co_{0.2}Mn_{0.3})O_2$ as a cathode active material, 4 wt % of carbon black as a conductive agent, and 4 wt % of polyvinylidene fluoride (PVdF) as a binder, to N-methyl-2-pyrrolidone (NMP) as a solvent. The cathode mixture slurry was applied onto an aluminum (Al) thin film as a cathode current collector with a thickness of about 20 μm and dried to produce a cathode, followed by employment of a roll press to complete the cathode.

Further, an anode mixture slurry was prepared by adding 96 wt % of carbon powder as an anode active material, 3 wt % of PVdF as a binder, and 1 wt % of carbon black as a conductive agent, to NMP as a solvent. The anode mixture slurry was applied onto a copper (Cu) thin film as an anode current collector with a thickness of 10 μm and dried to produce an anode, followed by employment of a roll press to complete the anode.

A pouch-type battery was produced by a conventional method using the above-constructed cathode and anode together with a separator composed of three layers of polypropylene/polyethylene/polypropylene (PP/PE/PP), into which the prepared non-aqueous electrolyte was injected to complete the manufacture of the lithium secondary battery.

Example 2

A non-aqueous electrolyte and a lithium secondary battery were prepared in the same manner as in Example 1, except that the content of the additive represented in Chemical Formula 2 was 1.0 wt % based on the total amount of the non-aqueous electrolyte.

Example 3

A non-aqueous electrolyte and a lithium secondary battery were prepared in the same manner as in Example 1, except that the content of the additive represented in Chemical Formula 2 was 3.0 wt % based on the total amount of the non-aqueous electrolyte.

Example 4

A non-aqueous electrolyte and a lithium secondary battery were prepared in the same manner as in Example 1, except that $CsCF_3SO_3$ was further added as an additive at a content of based on the total amount of the non-aqueous electrolyte.

Example 5

A non-aqueous electrolyte and a lithium secondary battery were prepared in the same manner as in Example 1, except that $CsPO_2F_2$ was further added as an additive at a content of 0.5 wt % based on the total amount of the non-aqueous electrolyte.

Example 6

A non-aqueous electrolyte and a lithium secondary battery were prepared in the same manner as in Example 1, except that the content of the additive of Chemical Formula 2 was 5.0 wt % based on the total amount of the non-aqueous electrolyte.

Example 7

A non-aqueous electrolyte and a lithium secondary battery were prepared in the same manner as in Example 1, except that $Li[Ni_{1/3}Co_{1/3}Mn_{1/3}]O_2$ was used as the above-described cathode active material.

Comparative Example 1

A non-aqueous electrolyte and a lithium secondary battery were prepared in the same manner as in Example 1, except that the additive described in Chemical Formula 2 was not added, but instead, 1.0 wt % of lithium difluoro bis(oxalate) phosphate was added to the non-aqueous electrolyte.

Comparative Example 2

A non-aqueous electrolyte and a lithium secondary battery were prepared in the same manner as in Example 1, except that 1.0 wt % of vinylene carbonate was added to the non-aqueous electrolyte.

Experiment and Evaluation

High Temperature Lifetime Evaluation

The lithium secondary test batteries were charged at a constant current until the voltage reached 4.20 V (vs. Li) at a current of 1.5 C rate at high temperature (45° C.). Subsequently, the lithium secondary batteries were cut-off at a current of 0.05 C rate while maintaining 4.20 V in a constant voltage mode. Then, the lithium secondary batteries were discharged at a constant current of 1.5 C rate until the voltage reached 3.0 V (vs. Li) at the time of discharging the batteries (1st cycle). The above-described cycle was repeated up to 300 cycles. The results of the above-described experiment are shown in Table 1.

TABLE 1

| | High Temperature Lifetime Characteristics | | |
|---|---|---|---|
| Test Subject | Initial Cycle Capacity (mAh) | $300^{th}$ Cycle Capacity (mAh) | Capacity Retention Rate (%) $300^{th}$ Cycle Capacity/Initial Cycle Capacity * 100(%) |
| Example 1 | 921.7 | 701.4 | 76.10 |
| Example 2 | 916.4 | 692.1 | 75.52 |
| Example 3 | 904.3 | 678.5 | 75.03 |
| Example 4 | 918.6 | 689.6 | 75.07 |
| Example 5 | 918.5 | 694.5 | 75.61 |
| Example 6 | 898.3 | 668.5 | 74.42 |
| Example 7 | 920.1 | 699.3 | 76.00 |
| Comparative Example 1 | 890.1 | 658.3 | 73.96 |
| Comparative Example 2 | 884.2 | 643.8 | 72.81 |

Low Temperature Lifetime Evaluation

The lithium secondary batteries were charged at room temperature (25° C.)—low temperature (−10° C.)—low temperature (−20° C.)—room temperature (25° C.) at a constant current until the voltage reached 4.20 V (vs. Li) at a current of 0.5 C rate. Subsequently, the lithium secondary batteries were cut-off at a current of 0.05 C rate while maintaining 4.20 V in a constant voltage mode. Then, the lithium secondary batteries were discharged at a constant current of 0.5 C rate until the voltage reached 3.0 V (vs. Li) at the time of discharging the battery (1st cycle). The above-described cycle was repeated 10 times for each temperature, sequentially. The capacity after the last cycle at each temperature was measured after repeating the cycle 10 times, and the capacity of the final cycle was measured after completing all the cycles (at room temperature (25° C.) low temperature (−10° C.) low temperature (−20° C.)—room temperature (25° C.)) to calculate the capacity retention rate. The results of the above-described charge/discharge experiment are shown in Table 2.

TABLE 2

Low Temperature Lifetime Characteristics

| Test Subjects | Room Temperature Cycle Capacity (mAh) | −10° C. Cycle Capacity (mAh) | −20° C. Cycle Capacity (mAh) | Room Temperature Cycle Capacity After Low Temperature Evaluation (mAh) | Capacity Retention Rate (%) Room Temperature Capacity After Low Temperature Evaluation/Initial Room Temperature Capacity * 100(%) |
|---|---|---|---|---|---|
| Example 1 | 912.4 | 542.1 | 239.6 | 456.4 | 50.02 |
| Example 2 | 907.2 | 532.9 | 233.5 | 441.9 | 48.71 |
| Example 3 | 898.2 | 522.1 | 226.9 | 434.1 | 48.33 |
| Example 4 | 909.3 | 537.0 | 233.6 | 448.9 | 49.37 |
| Example 5 | 909.1 | 535.8 | 234.3 | 449.8 | 49.48 |
| Example 6 | 891.2 | 512.7 | 220.5 | 426.2 | 47.82 |
| Example 7 | 909.8 | 539.5 | 236.9 | 452.6 | 49.75 |
| Comparative Example 1 | 881.7 | 506.9 | 218.0 | 419.2 | 47.54 |
| Comparative Example 2 | 874.2 | 498.7 | 215.1 | 412.4 | 47.17 |

60° C. Storage Characteristics

The secondary batteries of the Examples and Comparative Examples were placed in a chamber maintained at 25° C. and subjected to charge/discharge tests as follows using a charge/discharge device. First, the secondary batteries were charged up to 60% of SOC (state of charge) at 1 C, and then discharged/charged at 0.2 C for 10 seconds. Next, the batteries were discharged/charged at 0.5 C for 10 seconds. Thereafter, the secondary batteries were discharged and charged for 10 seconds in the same manner as above in the following sequences, 1 C, 2 C, and 3 C. Finally, the secondary batteries were charged at a current of 0.5 C to a voltage of 4.2 V. The initial impedance (DC-IR) was determined by calculating the slope of a trend line of the voltage-to-current graph constructed using the voltage values measured after discharging the batteries at 0.2 C, 0.5 C, 1 C, 2 C, and 3 C. After measuring the initial impedance, the batteries were placed in a chamber maintained at 60° C., and the impedance thereof was measured for 4 weeks (measured every week until the 4th week) to calculate the impedance (DC-IR). Results thereof are shown in Table 3.

TABLE 3

Storage Characteristics

| Test Subjects | Initial Impedance (mΩ) | Impedance After 60° C. Storage (mΩ) (after 4 W) | Change Rate (%) After 60° C. (mΩ)/ Initial Impedance (mΩ) * 100(%) |
|---|---|---|---|
| Example 1 | 45.2 | 62.8 | 138.94 |
| Example 2 | 45.9 | 64.8 | 141.18 |
| Example 3 | 46.3 | 65.9 | 142.33 |
| Example 4 | 45.5 | 63.9 | 140.44 |
| Example 5 | 45.4 | 64.0 | 140.97 |
| Example 6 | 46.9 | 67.3 | 143.50 |
| Example 7 | 45.4 | 63.3 | 139.43 |
| Comparative Example 1 | 47.3 | 69.1 | 146.09 |
| Comparative Example 2 | 47.6 | 69.9 | 146.85 |

Measurement of Thickness Change Rate

The following experiments were performed to evaluate the thickness change rate of each of the secondary batteries manufactured according to the Examples and Comparative Examples.

Lifetime characteristics of the lithium secondary batteries were confirmed by charging and discharging the batteries at 0.1 C for the 1st cycle, followed by charging and discharging at 0.5 C for the subsequent cycles. The thickness change rate was measured by disassembling each of the lithium secondary batteries in a charged state at the 300th cycle, respectively, measuring the electrode thickness at the 300th cycle, and comparing the measured electrode thickness values with the electrode thickness determined before the 1st cycle. Results thereof are shown in Table 4.

(electrode thickness in a charged state at the $300^{th}$ cycle−electrode thickness before $1st$ cycle)/electrode thickness before $1st$ cycle×100  Thickness Change Rate:

TABLE 4

| Test Subjects | Thickness Change Rate (%) |
|---|---|
| Example 1 | 105.9 |
| Example 2 | 106.9 |
| Example 3 | 107.4 |
| Example 4 | 106.3 |
| Example 5 | 106.6 |
| Example 6 | 108.1 |
| Example 7 | 106.0 |
| Comparative Example 1 | 108.6 |
| Comparative Example 2 | 109.1 |

It could be confirmed from the tables above that in view of the high temperature and low temperature lifetime characteristics, the high temperature storage characteristics, and the thickness change rate, the secondary batteries of the Examples of the present disclosure had significantly superior performance to the secondary batteries of the Comparative Examples in general.

Secondary batteries formed by including the electrolyte additive according to an embodiment of the present disclosure may have improved high temperature and low temperature lifetime characteristics, high temperature storage characteristics, and high temperature output characteristics.

What is claimed is:

1. A non-aqueous electrolyte comprising:

a lithium salt;

a non-aqueous organic solvent; and an electrolyte additive comprising:

a salt of an anion represented by Chemical Formula 1 below with $Cs^+$ or $Rb^+$:

[Chemical Formula 1]

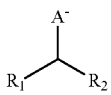

wherein A is O or S, and $R_1$ and $R_2$ are each independently a $C_1$-$C_{10}$ alkyl group in which all or some of the hydrogen atoms are substituted with halogen atoms.

2. The non-aqueous electrolyte of claim 1, wherein the content of the electrolyte additive is 0.05 to 10 wt % based on the total amount of the non-aqueous electrolyte.

3. The non-aqueous electrolyte of claim 1, wherein the lithium salt includes at least one selected from the group consisting of $LiPF_6$, $LiAsF_6$, $LiCF_3SO_3$, $LiN(CF_3SO_2)_2$, $LiBF_6$, $LiSbF_6$, $LiAlO_4$, $LiAlCl_4$, and $LiClO_4$.

4. The non-aqueous electrolyte of claim 1, wherein the lithium salt includes $LiPF_6$.

5. The non-aqueous electrolyte of claim 1, wherein the non-aqueous organic solvent includes at least one selected from the group consisting of an ether, an ester, an amide, a linear carbonate, a cyclic carbonate, a phosphate-based compound, a nitrile-based compound, a fluorinated ether-based compound, and a fluorinated aromatic compound.

6. A lithium secondary battery comprising:
a cathode including a cathode active material;
an anode including an anode active material;
a separator interposed between the cathode and the anode; and
the non-aqueous electrolyte of claim 1.

7. The lithium secondary battery of claim 6, wherein the cathode active material includes at least one selected from the group consisting of compounds represented by Chemical Formulas 6 to 8 below:

$Li[Ni_aCo_bMn_c]O_2$ [Chemical Formula 6]

($0.1 \leq c \leq 0.5$, $0 < a+b < 0.9$, $a+b+c=1$);

$LiMn_{2-x}M_xO_4$ [Chemical Formula 7]

(M is one or more elements selected from the group consisting of Ni, Co, Fe, P, S, Zr, Ti and Al, $0 < x \leq 2$);

$Li_{1+a}Co_xM_{1-x}BX_4$ [Chemical Formula 8]

(M is one or more elements selected from the group consisting of Al, Mg, Ni, Co, Mn, Ti, Ga, Cu, V, Nb, Zr, Ce, In, Zn, and Y, X is one or more elements selected from the group consisting of O, F, and N, B is P, S or a mixed element thereof, $0 \leq a \leq 0.2$, and $0.5 \leq x \leq 1$).

8. The lithium secondary battery of claim 6, wherein the cathode active material includes at least one selected from the group consisting of $Li[Ni_{0.6}Co_{0.2}Mn_{0.2}]O_2$, $Li(Ni_{0.5}Co_{0.2}Mn_{0.3})O_2$, $Li[Ni_{1/3}Co_{1/3}Mn_{1/3}]O_2$, and $LiCoO_2$.

9. The non-aqueous electrolyte of claim 1, wherein the anion represented by Chemical Formula 1 is one or more selected from the group consisting of anions represented by Chemical Formulas 2 to 5 below:

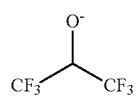 [Chemical Formula 2]

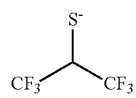 [Chemical Formula 3]

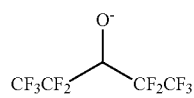 [Chemical Formula 4]

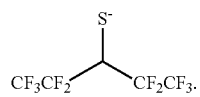 [Chemical Formula 5]

10. The non-aqueous electrolyte of claim 9, wherein the anion represented by Chemical Formula 1 is an anion represented by Chemical Formula 2 below:

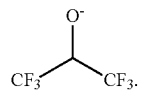 [Chemical Formula 2]

11. The non-aqueous electrolyte of claim 1, further comprising:
at least one salt selected from the group consisting of $CsCF_3SO_3$, $CsPO_2F_2$, $CsPF_2(C_2O_4)_2$ and $CsB(C_2O_4)_2$.

* * * * *